Figure 7:
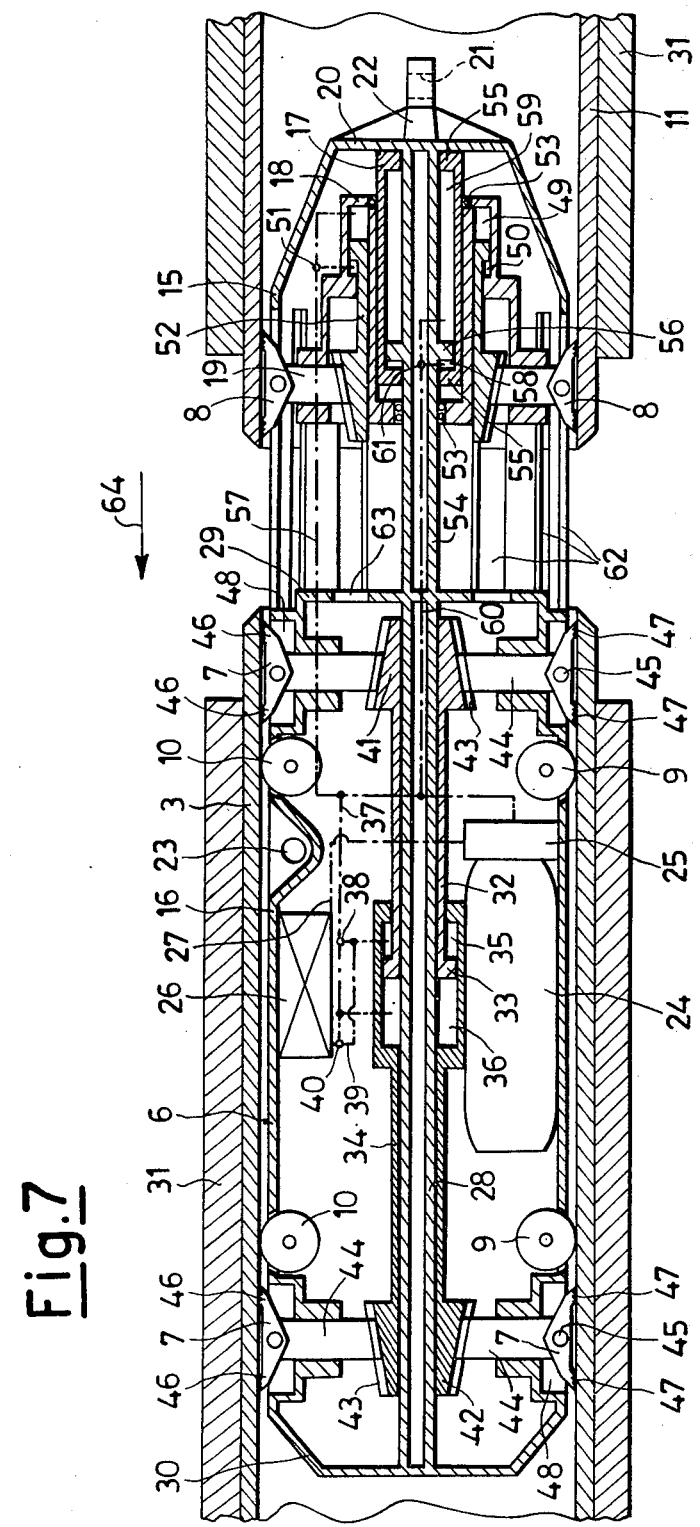

//!#[19] United States Patent
Meli

[11] 4,053,973
[45] Oct. 18, 1977

[54] PIPE-HANDLING APPARATUS

[75] Inventor: Fausto Meli, Carpaneto (Piacenza), Italy

[73] Assignee: Saipem S.p.A., Milan, Italy

[21] Appl. No.: 670,653

[22] Filed: Mar. 26, 1976

[30] Foreign Application Priority Data

Mar. 28, 1975 Italy .................................. 21777/75

[51] Int. Cl.² ............................................ B23P 19/04
[52] U.S. Cl. ..................................... 29/252; 228/44.5
[58] Field of Search .................. 29/244, 252; 228/44.5, 228/49

[56] References Cited

U.S. PATENT DOCUMENTS

| 2,615,413 | 10/1952 | Adams et al. | 228/44.5 |
| 3,233,315 | 2/1966 | Levake | 228/44.5 |
| 3,387,761 | 6/1968 | Pickard | 228/44.5 |
| 3,633,813 | 12/1972 | Looney | 228/44.5 |

FOREIGN PATENT DOCUMENTS 76,039  6/1930  Sweden .................................. 29/244

Primary Examiner—James L. Jones, Jr.
Attorney, Agent, or Firm—Morgan, Finnegan, Pine, Foley & Lee

[57] ABSTRACT

An apparatus or "coupler" for use in welding two lengths of pipe to be butt-welded, particularly suitable for welding a section of pipe to the end of a pipeline section being laid on the sea bottom, comprising an elongate body having a first portion and a second portion, which can be attached to respective pipes by means of respective attachment means and sliding means cooperating with the attachment means in order to move the first and second pipes towards each other, whereby, during the welding, not only the two pipes on internally changed to the said portions with their axes aligned, but are also drawn and held together, even when one of the pipes undergoes a longitudinal reciprocating movement.

13 Claims, 7 Drawing Figures

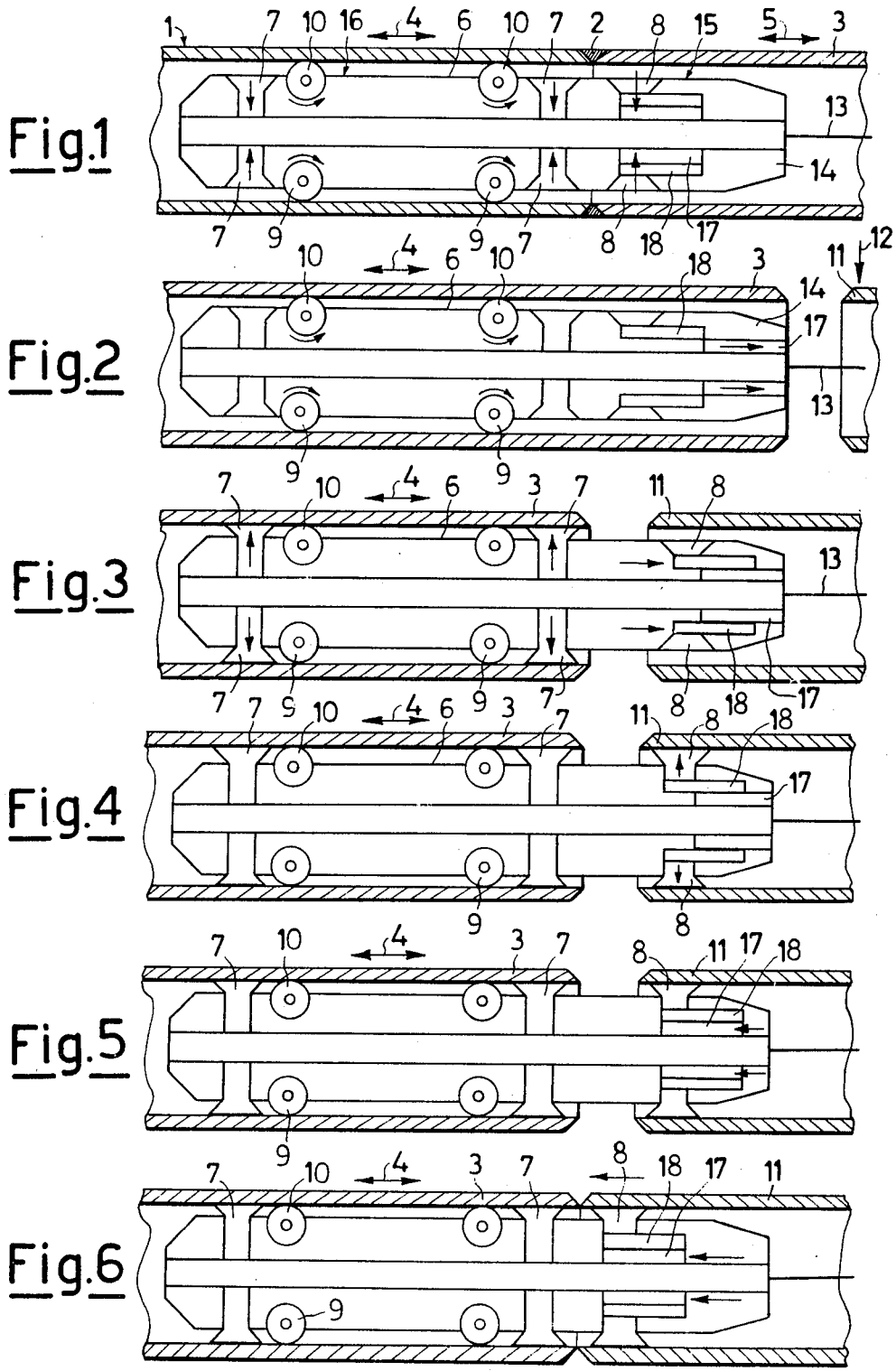

PIPE-HANDLING APPARATUS

This invention relates to an apparatus, herein called a "coupler", which can be used for internally clamping, aligning, bringing together, and keeping together during welding, two lengths of pipe to be butt-welded, particularly but not exclusively those lengths of pipe which are subjected to longitudinal reciprocation with respect to each other, as can be experienced for instance during welding operations on board a pipe-laying barge.

Such a device simplifies, speeds and makes cheaper the operation of welding a section of pipe, even if it has a great diameter, to a pipeline which has to be laid on the sea bottom.

It is known that during the laying of a submarine pipeline the barge or other surface vessel used for the laying is moved stepwise forward in the longitudinal direction a distance approximately equal to the length of the pipe length to be added by means of welding to the existing pipeline to be laid and, after the forward movement, because of inertia, the laying barge goes beyond the equilibrium position which should be reached at the end of the movement, and the barge is subjected to an elastic force in the aft direction proportional to the difference between the forward pull and the aft pull of the mooring cables or chains connected to the drums of winches arranged on the laying barge. This elastic force is dependent on the maximum movement of the laying barge and on the depth of the sea on which the barge is working.

Thus the anchored laying barge is subjected to a damped reciprocating motion about the position of static equilibrium expected at the end of the laying of the welded pipe length.

In addition, the longitudinal component of external forces, for example the wind sea currents, on the laying barge, induces a movement in the longitudinal direction, which is compounded with the aforementioned longitudinal movement.

The pipeline being laid is held by a pipeline tensioning machine mounted on the barge but when the pull exerted by the pipeline on the laying barge exceeds a predetermined value, the pipeline is released by the tensioning machine with the result that there is relative longitudinal movement between the pipeline and the laying barge, and consequently that end of the pipeline on board the barge end of the same pipe reciprocates with respect to that length of pipe to which it has to be welded.

It will thus be appreciated that welding operations between a new length of pipe and the pipe to be laid can be seriously hindered either by the time necessary for joining the ends to be welded or owing to the difficulty of maintaining joined the abutting ends during the welding, especially if a pipeline of great diameter is being laid.

Known internal couplers, which are preferred to external couplers for welding pipes of great diameter, do not make any provision for the bringing together of the ends of the two pipes to be welded; in fact, they work only after the ends of the pipes have been brought together, and their only function is to keep aligned the axes of the pipes which are to be welded. This requires either the immobility of the pipeline to which a length of pipe is to be joined, or, in the case of a pipeline-laying barge, the presence of a heavy, complicated and cumbersome movable framework, coupled to the pipeline to be laid, to which can be transferred the pipe length to be welded, so the end of the latter can be kept at a constant distance from the end of the pipeline to be laid and to which it is to be welded.

According to the present invention there is provided an apparatus suitable for attachment to, aligning, bringing together and maintaining together, two pipes to be butt-welded, which apparatus comprises:

an elongate body having a first portion and a second portion;

first actuatable attachment means in the region of the first portion, capable, upon actuation in use, of attachment to, and of symmetric location of the first portion within, a first pipe;

second actuatable attachment means in the region of the second portion, capable, upon actuation in use, of attachment to, and of symmetric location of the second portion within, a second pipe;

sliding means in the region of the first portion, which sliding means carries directly or indirectly the first actuatable attachment means and is capable of being moved in the longitudinal direction with respect to the first portion;

means for actuating the first and second actuatable attachment means, independently or otherwise; and motive means for causing movement in the longitudinal direction of the sliding means;

the arrangement being such that, in use, the first portion can be disposed in the first pipe and the second portion disposed in the second pipe spaced-apart from the first pipe, the actuating means is operated to cause the first and second attachment means to attach themselves to the first and second pipes respectively, and the motive means is then operated to move the sliding means towards the second portion and hence move the first and second pipes towards each other.

The apparatus of the present invention makes it possible not only to clamp internally the pipes and to keep their axes aligned, but also to bring the ends of the pipes together with a high degree of precision and to keep them held together during the welding, even when one of the pipes is subjected to a longitudinal reciprocating movement, as can happen in particular on board a pipe-laying barge.

The coupler of the present invention can also be used advantageously on dry land for welding pipes having a great diameter.

The elongate body of the coupler according to the present invention can be generally cylindrical over at least a majority of its length and can be tapered at the two ends and is divided in two portions; the second (or rear) portion is to slide inside a pipe to be welded (in particular the pipeline to be laid) and can be provided with two pairs of driving wheels projecting from the cylindrical body in a lower part, and with two pairs of guide-wheels in an upper part. The pads can be carried by respective reciprocatable, radially disposed connecting members which are connected to wedge-shaped elements capable of movement in an axial direction in a manner such that movement in one direction causes outward radial movement of the connecting members and pads and such that movement in the opposite direction causes inward radial movement of the connecting members and pads.

In the second portion of the cylindrical shell can be provided radially two groups of pressure pads, which are operated by for example hydraulic and mechanical mechanisms, contained inside the cylindrical shell and can be moved outward from the shell to clamp and align the second portion inside the pipe.

The first (or front) portion of the cylindrical shell can be connected to the rear portion by means of a hollow shaft, whose axis coincides with the axis of the cylindrical shell.

The front portion can be provided with a radially disposed group of pressure pads similar to those provided for the rear portion.

The sliding means in the front portion can be constituted by two components, namely a cylindrical component called a "slide" coaxial with the shaft and sliding on it, and another generally cylindrical component called a "slider" also coaxial with the shaft and sliding on the slide in a telescopic manner.

On the slider can be the pressure pads which can be moved radially outward by means of the same mechanisms used in the second (or rear) portion so as to clamp and align the front portion of the cylindrical body inside the pipe to be brought to and welded to the pipe already clamped by the rear portion.

After clamping the two portions of the cylindrical body inside the two pipes to be welded, with the axes of the pipes coinciding with the axis of the cylindrical shell, the free ends of the pipes can be brought together by operating, for example by means of a fluid under pressure, the slide contained in the front portion of the coupler and sliding on the hollow shaft.

The slide, on which the slider clamped to the pipe to be welded is sliding telescopically, can after travelling a certain distance then move the slider towards the rear portion, thereby bringing together to the required distance.

Between the external surface of the slide and the surface of the slider which slides on the same slide, a series of ball bearings can be inserted to facilitate the sliding; this permits the slider to be moved manually or by means of an electric motor to a better position for welding, before being clamped to the pipe to be moved.

Preferably the pressure pads are arranged with their longest dimension parallel to the longitudinal axis of the coupler; they are preferably pivoted on their center lines to their supporting columns and preferably have contact faces for contacting the internal surface of the pipe, which are designed to grip the pipe firmly.

Cables for the supply of energy and for the electric control of the motors and valves of the coupler can be grouped in an external portable box, which is connected to the head of the coupler by means of an electrical plug.

For a better understanding of the present invention and to show how the same may be carried into effect, reference will now be made, by way of example, to the accompanying drawings in which:

FIGS. 1 to 6 show schematically a coupler according to the present invention, inside a pipeline, at subsequent stages during the cycle comprising (i) advancement of the coupler from the welded region between a pipeline and a pipe length, (ii) location of part of the coupler within a further pipe length to be joined to the pipeline, (iii) the securing of the coupler to the pipeline, (iv) the securing of the coupler to the further pipe length, and (v) the bringing together of the further pipe length and the pipeline; and FIG. 7 is a vertical, axial section, partly cut-away through a coupler according to the present invention located in a pipeline and in a pipe length to be joined to the pipeline.

Referring firstly to FIG. 1, there is shown a pipeline 1 to be laid, to which a pipe length 3 is joined by means of a weld 2.

The pipeline 1 is subjected to a reciprocating longitudinal movement in the directions indicated by the arrow 4, which obviously induces the same movement in the pipe length 3, as shown by the arrow 5. Bridging the pipeline 1 and the pipe length 3 is the coupler 6 which has a front portion 15 and a rear portion 16.

The rear portion 16 is provided with two sets of radially disposed, hydraulically actuatable pressure pads 7 which can be projected radially or retracted radially, and with a set of driving wheels 9 and a set of guide wheels 10. The front portion 15 is provided with one similar set of radially disposed, hydraulically actuatable pressure pads 8 carried on an annular slider 18 mounted on, and slidable along an annular slide 17 which in turn is mounted on and slidable along an axial hollow shaft (indicated by the reference numeral 28 in FIG. 7). The slide 17 can be moved along the shaft 28 by, for example, a suitable hydraulic system; and the slider 18 can be moved along the slide 17, for example, by hand or by an electric motor.

In the stage of the cycle shown in FIG. 1, the pipe length 3 is welded to the pipeline 1, the pads 7 and 8 are retracted, and the wheels 9 are rotated to cause the coupler 6 to move forward through the pipe length 3. As this is happening, the slide 17 is caused to move towards the leading end 14 of the front portion, as is shown in FIG. 2. At this stage a further pipe length 11 is moved sideways, as indicated by the arrow 12, until it is approximately aligned with the front of the pipe length 3. A cable 13 which can act as a safety cable and to which can be attached an electric cable (not shown) for supplying power to the coupler, is threaded through the pipe length 11, and is connected to the leading end 14 of the front portion 15.

Further forward movement of the coupler brings the front portion 15 within the pipe length 11, as shown in FIG. 3 and the slider 18 is moved forward along the slide 17. When the coupler 6 is correctly positioned with respect to the pipe lengths 3 and 11, the driving wheels 9 are stopped and the pads 7 are caused to project so that the rear portion 16 is located firmly in the pipe length 3. Depending on the extent to which the front portion 15 projects into the pipe length 11 and the extent to which the slider 18 is advanced along the slide 17, the pads 8 can be positioned opposite, or someway in from, the end region of the pipe length 11.

Then, as shown in FIG. 4, the pads 8 are extended to grip firmly the inside surface of the pipe length 11, and this assists in the aligning of the pipe length 11 with the pipe length 3.

Then, as shown in FIG. 5, the slide 17 is caused to move towards the rear portion 16 until it comes level with slider 18, whereupon it causes the slider 18 to travel with it towards the rear portion 18. In view of the fact that the slider 18 is clamped to the pipe length 11 by pads 8, this movement of slider 18 causes the pipe length 11 to be moved towards the pipe length 3 until either they abut or they are at an appropriate distance for welding, this final position as being shown in FIG. 6. After welding, the pads 7 and 8 can be retracted so that the system adopts the form shown in FIG. 1, except that the coupler 6 is now one pipe length further along its initial position.

Reference will now be made to FIG. 7 which shows the coupler 6 within two spaced-apart pipe lengths 3 and 11, in fact at a position corresponding to that shown in FIG. 4.

The coupler 6 is generally cylindrical over the majority of its length, but is tapered at the leading end region of the front portion 15 and is tapered at the trailing end region of the rear portion 16. The leading end region of the coupler 6 is provided with a head 20 on which is mounted a ring 21 (for attachment of the cable 13) and a socket 22 into which a plug (not shown) at the end of an electric cable can be fitted. The trailing end of the rear portion 16 is in the form of a cover 30, and an axially disposed, hollow shaft 28 extends from the cover 30 to the head 20. A bulkhead 29 supports the shaft 28 in a region intermediate its end, and the bulkhead 29 can be regarded as the border between the front portion 15 and the rear portion 16.

The coupler 6 is provided at approximately its midpoint with a hole 23 in an upper region, which hole can be used to locate a hook for lifting the coupler 6.

Also shown in FIG. 7 are the pads 7 and 8, the driving wheels 9, the guide wheels 10, the slide 17 and the slider 18 shown in outline form in FIGS. 1 to 6.

In the coupler of FIG. 7, the rear portion 16 includes two axially spaced-apart sets of radially disposed pads 7, each pad 7 being fixed by a pin 45 to a radially disposed column 44 provided at its inner end region with a dovetail-shaped projection accommodated in a dovetail-shaped groove 43 provided in a wedge 41 or 42, the arrangement being such that axial movement of the wedge 41 or 42 causes radial movement of the column 44 and hence of the pad 7. This arrangement applies to each of the pads 7, and a similar arrangement applies to each of the pads 8, except that there the column which carries each pad is numbered 19, but otherwise the arrangement is similar.

The contact faces 46 of the pads 7 and 8 are roughened or provided with indentations or come other pattern with a view to increasing the adhesion between the pads and the inner surface of the pipe length 3 or 11 when the pads 7 or 8 project out of the coupler 6. Appropriate openings 47 are provided in the main body of the coupler 6 to permit the pads to be projected, and appropriate housings 48 are also provided to enable the pads to be fully retracted within the main body of the coupler 6.

Inside the rear portion are located, in a lower region, an electric motor 24 for driving a hyraulic pump 25, and, in an upper region, a tank 26 for collecting hydraulic medium expelled from various chambers (described below). The pump 25 supplies the energy necessary to operate various components of the coupler, and the pump 25 is fed with hydraulic medium by means of a feed conduit 27 extending from the tank 26.

Also in a lower region of the rear portion 16 are two pairs of driving wheels 9 which can be driven in the forward or backward direction by two electric motors (not shown). In an upper part of the rear portion, two further pairs of wheels, the guide wheels 10, are generally urged beyond the main body of the coupler 6 by means of springs (not shown), and their purposes is to guide the coupler during its movements inside the pipeline to be laid.

The pipe length 3 already attached to the pipeline to be laid and the pipe length 11 which is still to be attached to pipe length 3, are provided with a concrete coating 31 for weighting purposes.

Mounted on, and slidable along, that portion of the hollow shaft within the rear portion 16 is a slider 32 which carries at its right-hand end the wedges 41 and which is provided at its left hand end with an outward annular projection 33.

Also mounted on and slidable with respect to the shaft 28 is a slider 34 which carries at its left-hand end the wedges 42 and which at its right-hand end extends beyond the projection 33 in a manner such as to define two chambers 35 and 36 of variable size, taking into account the fact that the sliders 32 and 34 slide with respect to each other. It can be seen here that the projection 33 cooperates with the internal wall of a region of the slider 34 having an increased internal diameter. Moreover, the extreme right-hand end region of the slider 34 slidably abuts the external surface of the slider 32.

The two chambers 35 and 36 are connected to the hydraulic pump 25 by means of a conduit 37 and a control valve 38 which directs the hydraulic medium from the hydraulic pump to one or other of the chambers 35 and 36. These two chambers 35 and 36 are also connected by a conduit 39 leading to the tank 26 and provided with a control valve 40. Before describing in detail the components present in the front portion 15 of the coupler 6, the method of operating the pads 7 in the rear portion 16 will first be described. In order to cause the pads 7 to be projected radially from the coupler 6, the control valve 8 is turned in such a way that the hydraulic medium from the hydraulic pump 25 is introduced into the chamber 36, and the valve 40 is turned in such a way as to permit the expulsion of hydraulic medium from the chamber 35. The introduction of hydraulic medium into the chamber 36 causes the slider 34 with its series of wedges 42 (only two of which are shown) to be moved towards the left (in FIG. 7), and causes the slider 32 with its corresponding series of wedges 41 to be moved towards the right. Consequently the columns 42 are forced radially outwards, which in turn ensures that the contact faces 46 of the pads 7 are urged strongly against the inner surface of the pipe length 3. This ensures that the rear portion 6 of the coupler is truly aligned within the pipe length 3.

When the time comes for the pads 7 to be retracted within the coupler 6, the control valve 38 is turned so as to prevent the flow of hydraulic medium to the chamber 36 but to permit the flow of this medium to the chamber 35. Similarly, the control valve 40 is turned so as to permit the flow of hydraulic medium from the chamber 36 to the tank 26. Introduction of the hydraulic medium into the chamber 35 causes the slider 34 to move to the right and the slider 32 to move to the left, with the result that the columns 44 and pads 7 are withdrawn into the coupler 6.

As regards the components present in the front portion 15 of the coupler 6, the slide 17 is provided with two spaced-apart inwardly directed, annular projections 55 which sealingly but slidably engage that part 54 of the hollow shaft 28 within the front portion 15. Between the projections 55 is a projection 56 mounted on the shaft 54 in a manner such that two chambers 58 and 59 of variable magnitude are defined. Leading from the hydraulic pump 25 is a conduit 60 provided with a control valve 61 which enables hydraulic medium under pressure to be directed into one or other of chambers 58 and 59, and there is also provided (but not shown) a conduit and control valve for allowing hydraulic medium to be discharged from one or other of the chambers 58 and 59 to the tank 26. Thus there is provision for causing the slide 17 to move forwards or backwards along the shaft 54.

Positioned mainly outside the slide 17 is a slider 18 which is slidable with respect to the shaft 54 with the aid of steel ball bearings 53, and is slidable with respect to the slide 17. The left-hand end region of the slider 18 is provided with an inwardly directed, annular projection against which the left-hand end of the slide 17 can abut, to cause both the slider 18 and the slide 17 to move to the left. There is no corresponding provision at the right-hand end of the slider 18 and, therefore, movement to the right by the slide 17 does not necessarily cause any corresponding movement by the slider 18.

The slider 18 which is generally annular is provided with an internal slider 52 provided at its left-hand region with wedges which engage the inner end regions of columns 19 which carry at their outer ends the pads 8. The shape of the slider 18 and that of the slider 52 is such that two chambers 49 and 50 are defined, these two chambers being of variable magnitude depending on the relative positions of the slider 52 and slider 18. A conduit 57 extends from the hydraulic pump 25 and is provided with a control valve 51 which enables hydraulic medium under pressure to be directed to one or other of chambers 49 and 50. Also present, but not shown, are a conduit for draining hydraulic medium from chambers 49 and 50 to the tank 26, as well as a control valve, the overall arrangement being similar to the arrangements for introducing or removing hydraulic medium from the chambers 35 and 36 in the rear portion 16 of the coupler 6.

The front portion 15 is provided with a series of longitudinal extending slots 62 to permit longitudinal movement of the pads 8, and holes 63 are provided in the bulkhead 29 to allow the maximum desired travel to the left of the slider 52 and the wedges carried by that slider.

When the apparatus is in the state shown in FIG. 7, in other words with the pads 7 firmly abutting the pipe length 3 and with the pads 8 firmly abutting the pipe length 11, hydraulic medium under pressure is introduced via conduit 60 and valve 61 into the chamber 58, and hydraulic medium in chamber 59 is allowed to be discharged to the tank 26. The introduction of hydraulic medium into the chamber 58 causes the slide 17 to move to the left in FIG. 7 and, after it has covered a short distance, the left-hand end of the slide 17 abuts the inward projection on the slider 18 so that further movement to the left by the slide 17 means movement to the left of the slider 18 and the equipment carried by the slider 18, including the pads 8. This movement to the left causes movement to the left (indicated by the arrow 64) of the pipe length 11 which can either abut the pipe length 3 or be brought to a close distance suitable for welding.

What we claim is:

1. An apparatus for attachment to, alignment of, bringing together and maintaining together during welding, a first and a second pipe to be butt-welded, comprising:
   an elongate body having a first portion and a second portion located along a unitary shaft lying on the axis of the elongate body;
   first actuatable attachment means operatively connected to said shaft, which means slide in a radial direction in the first portion of the apparatus, for attachment to the first pipe and for symmetrical alignment of the first pipe about the first portion;
   second actuatable attachment means operatively connected to said shaft, which means slide in a radial direction in the second portion of the apparatus, for attachment to the second pipe and for symmetrical alignment of the second pipe about the second portion;
   actuating means operatively connected to said shaft and slidably connected to said first and second attachment means for sliding said first and second attachment means into attachment with the first and second pipe and for symmetrical alignment of the pipes about the first and second portions of the apparatus; and
   sliding means slidably mounted on said shaft in the first portion of the apparatus, and cooperating with said first attachment means for moving said first attachment means toward said second portion, to cause the first pipe to be brought into substantial abutment with the second pipe.

2. An apparatus according to claim 1, further comprising powered driving means mounted on said elongate body for transporting said apparatus along the interior of a pipe.

3. An apparatus according to claim 1, wherein the sliding means comprises a first component slidable along the shaft and a second component slidable along the first component, the second component cooperating with the first actuatable attachment means to move said first actuatable attachment means towards the second portion of the apparatus.

4. An apparatus according to claim 3, wherein the end of the second component nearest the second portion of the apparatus includes an inwardly-directed annular projection against which the end of the first component nearest the second portion can abut, so that said first component can move toward the first portion and away from the second portion without causing movement of the second component, and so that movement of the first component over at least part of its maximum travel towards the second portion causes movement of the second component in the same direction.

5. An apparatus according to claim 1, wherein the first and second actuatable attachment means each comprise pads radially disposed with respect to the elongate body, and capable of being moved radially inwards and outwards to disengage and engage the internal wall of the first and second pipes, respectively.

6. An apparatus according to claim 5, wherein each of the pads is connected to a reciprocatable radially disposed connecting member slidably mounted on a wedge-shaped element capable of movement in an axial direction in a manner such that movement of the element in one axial direction causes outward radial movement of the associated connecting member and pad, and such that movement in the opposite direction causes inward radial movement of the associated connecting member and pad.

7. An apparatus according to claim 1, wherein said actuating means for sliding the first and second actuatable attachment means into attachment with the pipes includes a hydraulic system having piston rod members attached to the first and second actuatable attachment means.

8. An apparatus according to claim 7, wherein said sliding means includes a hydraulic system.

9. An apparatus according to claim 8, wherein the hydraulic systems are powered by a pump located inside the elongate body.

10. An apparatus according to claim 1, further comprising electrical cable attachment means located at one end of the elongate body for attaching an electrical cable to provide power to the apparatus.

11. An apparatus according to claim 10, further comprising electrical socket means mounted on the body, for supplying electricity to any electrical equipment carried by the elongate body.

12. An apparatus according to claim 1, wherein the elongate body is substantially cylindrical over most of its length.

13. An apparatus according to claim 12, wherein the opposite end regions of the elongate body are tapered.

* * * * *

UNITED STATES PATENT OFFICE
CERTIFICATE OF CORRECTION

PATENT NO. : 4,053,973
DATED : October 18, 1977
INVENTOR(S) : Fausto Meli

It is certified that error appears in the above-identified patent and that said Letters Patent are hereby corrected as shown below:

IN THE SPECIFICATION: Col. 6, line 9, insert --can-- before "slide"; Col. 6, line 41, "6" should read --16--.

Signed and Sealed this

Seventh Day of February 1978

[SEAL]

Attest:

RUTH C. MASON
Attesting Officer

LUTRELLE F. PARKER
Acting Commissioner of Patents and Trademarks